US012630338B2

(12) United States Patent
Weyrauch

(10) Patent No.: US 12,630,338 B2
(45) Date of Patent: May 19, 2026

(54) PLASTIC CONTAINER

(71) Applicant: Mauser-Werke GmbH, Bruehl (DE)

(72) Inventor: Detlev Weyrauch,
Kreuzau-Untermaubach (DE)

(73) Assignee: MAUSER-WERKE GMBH, Bruehl
(DE)

( * ) Notice: Subject to any disclaimer, the term of this
patent is extended or adjusted under 35
U.S.C. 154(b) by 0 days.

(21) Appl. No.: 18/784,539

(22) Filed: Jul. 25, 2024

(65) Prior Publication Data

US 2024/0383647 A1     Nov. 21, 2024

Related U.S. Application Data

(62) Division of application No. 17/277,481, filed as
application No. PCT/EP2019/000275 on Sep. 20,
2019, now Pat. No. 12,071,276.

(30) Foreign Application Priority Data

Sep. 21, 2018     (DE) ...................... 20 2018 004 383.4

(51) Int. Cl.
B65D 25/42     (2006.01)
B29C 65/00     (2006.01)
     (Continued)

(52) U.S. Cl.
CPC .............. B65D 25/42 (2013.01); B29C 65/20
(2013.01); B29C 66/1122 (2013.01);
     (Continued)

(58) Field of Classification Search
CPC ......... B65D 25/42; B65D 11/08; B29C 65/20;
B29C 66/122; B29C 66/118; B29C
66/5344; B29C 66/73921
     (Continued)

(56) References Cited

U.S. PATENT DOCUMENTS 3,958,719 A     5/1976   Ward
3,985,257 A  *  10/1976  Shaffer ................ B65D 39/082
                                                        220/672
(Continued)

FOREIGN PATENT DOCUMENTS

CN     1054043 A     8/1991
CN     1298341 A     6/2001
     (Continued)

OTHER PUBLICATIONS

International Search Report, dated Jan. 3, 2020 in corresponding
International Application No. PCT/EP2019/000275.
     (Continued)

*Primary Examiner* — Rafael A Ortiz
*Assistant Examiner* — Niki M Eloshway
(74) *Attorney, Agent, or Firm* — Michael Best &
Friedrich LLP

(57)     ABSTRACT

A method for creating a container is disclosed. The method
can include creating a container body from a thermoplastic
material via a blow molding process to thereby form a first
opening extending through a top of the container body,
creating a bung attachment part via an injection molding
process to thereby form a second opening extending through
the bung attachment part and an internally threaded surface
located within the second opening, and attaching the bung
attachment part to the top of the container body such that the
second opening is at least partially aligned with the first
opening.

7 Claims, 4 Drawing Sheets

Figure 1:
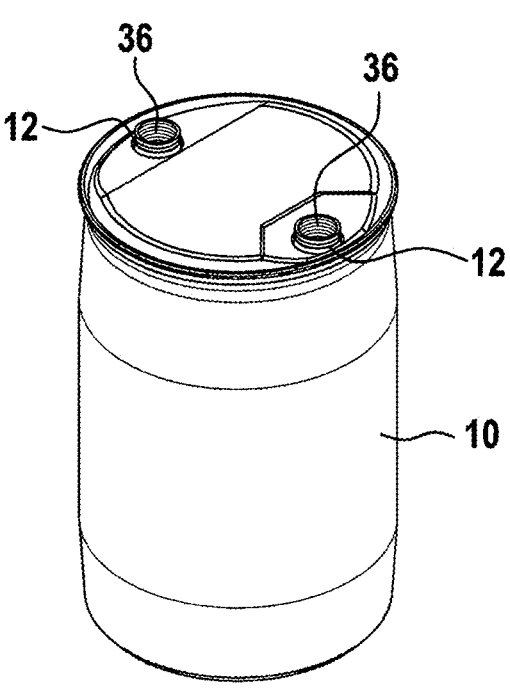

(51) Int. Cl.
    *B29C 65/20*      (2006.01)
    *B29L 31/00*      (2006.01)
    *B65D 8/02*       (2006.01)

(52) U.S. Cl.
    CPC ........ *B29C 66/118* (2013.01); *B29C 66/5344*
        (2013.01); *B29C 66/73921* (2013.01); *B29L*
        *2031/712* (2013.01); *B65D 11/08* (2013.01)

(58) Field of Classification Search
    USPC ......................................................... 220/601
    See application file for complete search history.

(56)                 References Cited

U.S. PATENT DOCUMENTS

| | | | | |
|---|---|---|---|---|
| 5,075,951 | A | * | 12/1991 | Schurr .................... B23P 15/00 |
| | | | | 220/601 |
| 5,217,138 | A | * | 6/1993 | Nichols .................. B65D 77/06 |
| | | | | 220/601 |
| 5,975,338 | A | | 11/1999 | Przytulla et al. |
| 6,206,222 | B1 | | 3/2001 | Cudzik |
| 2002/0027146 | A1 | * | 3/2002 | de LaForcade .... B65D 21/0223 |
| | | | | 222/402.1 |
| 2005/0121451 | A1 | * | 6/2005 | Van Bruggen ......... B65D 51/18 |
| | | | | 220/257.2 |
| 2005/0269329 | A1 | | 12/2005 | Baughman |
| 2007/0181582 | A1 | | 8/2007 | Gerard et al. |

| | | | |
|---|---|---|---|
| 2017/0113829 | A1 | 4/2017 | Geser et al. |
| 2019/0217990 | A1 | 7/2019 | Weyrauch |
| 2023/0211541 | A1 | 7/2023 | Blömer et al. |

FOREIGN PATENT DOCUMENTS

| | | | | | |
|---|---|---|---|---|---|
| DE | 3823119 | A1 | 1/1990 | | |
| DE | 8717837 | U1 | 7/1990 | | |
| DE | 4220339 | C2 | 11/1995 | | |
| DE | 29521283 | U1 | 1/1997 | | |
| EP | 0366129 | A1 | 5/1990 | | |
| EP | 0515390 | A1 | 12/1992 | | |
| EP | 0515390 | B1 | 12/1992 | | |
| EP | 0721892 | A1 | 5/1996 | | |
| EP | 0934815 | A2 | * | 8/1999 | ........ B29C 66/8322 |
| GB | 833359 | A | 4/1960 | | |
| JP | H0518479 | A | 1/1993 | | |
| JP | 2006103760 | A | 4/2006 | | |
| WO | 199112179 | A1 | 8/1991 | | |
| WO | 2006110714 | A2 | 10/2006 | | |
| WO | 2009133265 | A1 | 4/2017 | | |
| WO | 2018/054527 | A1 | 3/2018 | | |
| WO | 2020057775 | A1 | 3/2020 | | |

OTHER PUBLICATIONS

International Preliminary Report on Patentability for International Application No. PCT/EP2019/000275, dated Sep. 17, 2020, 29 Pages.

* cited by examiner

PLASTIC CONTAINER

CROSS REFERENCE TO RELATED APPLICATIONS

This application is a divisional patent application of U.S. patent application Ser. No. 17/277,481, filed on Mar. 18, 2021, now U.S. Pat. No. 12,071,276, entitled "Plastic Container," which is a 371 National Stage Application of International Patent Application No. PCT/EP2019/000275, filed on Sep. 20, 2019, entitled "Plastic Container," which claims priority to German Patent Application No. 202018004383.4, filed on Sep. 21, 2018, the disclosures of which are incorporated by reference in their respective entireties as if the same were fully set forth herein.

DISCUSSION

The invention relates to a container made of thermoplastic material for the storage and transport of liquid or free-flowing contents, which container is produced in a blow molding process and, at a container opening in the top of the container, is provided with a welded-on bung connector part prefabricated in an injection molding process and having internal threads for closing the container opening which are provided at the upper end.

Usually, blow-molded plastic containers of this type are drums with a handling ring, coming in drum sizes from 120 liters to 250 liters. The most common are drums which have a storage capacity of 220 liters, but there are also others on the market. Other plastic containers, such as e.g. 30 or 60 liter canisters with bung fitting closures are likewise known. All of these plastic containers are used for the storage and transport of liquid or free-flowing filling contents and are usually equipped with a larger 2-inch and a smaller ¾-inch bung opening, the larger bung serving for filling and removing the filling material and the smaller bung serving as a ventilation bung during the filling and removal operation.

In industrial chemistry, large quantities of plastic containers of this type are generally filled virtually exclusively in automatic filling installations at the end of the process for preparing chemical liquids. In this respect, the plastic container is positioned such that the bung connectors are always precisely oriented and automatic unscrewing devices can grasp and unscrew the bung fittings. A filling lance then moves into the larger 2-inch bung opening and the liquid contents are pumped into the container at a high filling pressure. After the filling operation has been completed, the bung fittings are screwed back into the filling/removal connector and the ventilation connector by the automatic unscrewing machine.

Problem

Plastic containers with bung fittings are produced in large numbers worldwide, for the most part in a blow molding process. In the process, the hollow bodies are inflated from an extruded tubular preform between two blow mold halves, which can be moved together horizontally, under the action of injected compressed air to afford their final form. When the two blow mold halves move together, the tubular preform is squeezed out and welded at the top and bottom. Normally, the bottom of the container body is formed in the top of the blow mold and the top of the container body with the bung openings is formed in the bottom of the blow mold. The length of the flash seam and the exact position of the bung connectors can be set by means of movable expanding and blowing mandrels. The shaping of the bottom of the container body in the top of the blow mold is comparatively simple because the bottom, as a standing surface for the container body, should have a form as flat and planar as possible, if necessary with stiffening beads, while the forming of the top of the container body, with an handling ring encircling the outer circumference, with a convex or higher middle part and with two diametrically oppositely situated bung connectors which are placed deeper in bung hollows, has a considerably more difficult configuration. The particular art of blow molding technology consists in the ingenious control of the wall thickness of the extruded tubular preform, since there should be the same wall thickness as far as possible everywhere on the finished container body. This is not entirely possible in terms of process technology, since there is always a thickening of material at both ends of the upper and lower flash seam of the tubular preform. In the bottom of the container body, the two thickenings of material are drawn as flat as possible. The resultant thickenings of material in the top of the container body are used to form two bung connectors, having internal threads, on two blowing mandrels arranged below the blow mold in the top of the container body. The two bung connectors are each arranged in the top in a manner recessed in a bung hollow or a bung housing. The handling ring encircling the outer circumference of the top is molded on from the plastic material of the tubular preform during the blow molding operation by means of vertically displaceable mold slides. After the blow molding operation has ended, before the finished container body is removed from the blow mold, the blowing mandrels are unscrewed from the molded-on bung connectors having internal threads. While the vertical container wall and the bottom of the hollow body are cooled comparatively quickly, the components such as the handling ring and bung connector, which entail increased use of material, understandably require a longer cooling time to room temperature. Since the same cooling conditions are not present in all directions on the bung connectors due to thickenings of material on the one side and also due to a flash seam, which runs in on one side, on the other side and the proximity of the solid handling ring, this can lead to material distortion and deviations in the geometric dimensions as a result of the blow molding, possibly with subsequent cooling under internal pressure.

Here, it is possible that e.g. the bung openings in the bung connectors become oval in shape, with the result that the seal of a screwed-in bung fitting on the seal seat can no longer provide a complete sealing action and the bung closure becomes leaky, in particular when a container filled with liquid contents falls over. In addition, disruptive film-like plastic appendages which have a detrimental effect on the seat of the screwed-in bung fitting can form on the flash seam which runs in on one side.

On the other hand, the bung connectors themselves can warp into a slight inclination, which later can lead to problems in the automatic filling installations when containers of this type are being filled if e.g. the automatic unscrewing machine for the bung fitting cannot engage exactly into the upper recesses in the bung fitting for the screw head tool or the vertically descending filling lances for pressure filling cannot precisely move into the bung openings of the bung connectors. Faults in automatic industrial-chemical filling installations that are caused by this cost time and money and result in dissatisfied customers.

PRIOR ART

The document EP 0 515 390 B1 discloses a blow-molded bung drum made of thermoplastic material, in which a bung connector prefabricated in an injection molding process is welded into the top of the drum body. In this respect, the bung connector has a pipe piece which has an internal thread and protrudes to some extent into the drum body. This structure was selected because the bung housing has a very flat form and the upper edge of the bung connector with the screwed-in bung fitting does not protrude beyond the top, but should terminate flush therewith. In order that there is a sufficient number of thread turns for a secure seat of the screwed-in bung fitting, the bung connector pipe piece is displaced here to some extent into the drum interior. In order nevertheless to allow good residual emptying, the bung connector pipe piece is provided with a cutout or aperture on the side facing outward toward the handling ring, with the result that the last drops of residual liquid can flow out from the drum interior. The bung connector pipe piece was welded in by deposition welding with the addition of molten plastic material. In the absence of corresponding welding surfaces, the bung connector pipe piece cannot be welded in using a mirror welding process.

In the publication WO 2018/054 527 A1, it appears in the drawings of the figures that a whole bung hollow area, including bung connectors, is welded into the top of a drum with a handling ring, although nothing at all is mentioned in the description because the underlying inventive concept relates specifically to the use of a thin-walled inliner.

From the prior art, the use of the mirror welding process for plastic containers is known from numerous prior publications, such as e.g. from EP 0 721 892 A1. Said document describes that, for a bung drum, the top of the drum, including the carrying and transport ring, bung connectors and attachment elements, is prefabricated in an injection molding process and then welded onto a blow-molded drum body blank. In another embodiment, a plastic drum of this type can of course also be welded together from a top and a bottom which are prefabricated in an injection molding process with an extruded cylindrical drum body blank composed of three parts.

Object

The present invention is based on the object of rectifying the above-mentioned disadvantages of the prior art and of proposing an option for the optimal welding in—preferably in a mirror welding process—of bung connectors or bung connector parts, which are prefabricated separately in an injection molding process and have internal threads, onto plastic containers, such as drums, canisters and inner containers for pallet containers, produced in a blow molding process in such a way that, when using blow-molded plastic containers in existing filling and pumping installations, container-related faults no longer occur or can be minimized to the greatest possible extent.

Solution

This object is achieved by the special features of patent claim 1. The features in the dependent claims describe further advantageous configuration options of the blow-molded container according to the invention having welded-on bung connector parts prefabricated in an injection molding process. The proposed technical teaching conveys in a simple manner how the disadvantages of known blow-molded plastic containers can be overcome; this is achieved in design terms by the following features:

provided on the container side is an annular welding surface with a circular inner edge and a circular outer edge, the bung connector part prefabricated in an injection molding process is designed as a solid threaded welding head with an internal thread and has a corresponding annular welding surface with a circular inner edge and a circular outer edge, and the two annular welding surfaces are materially bonded to one another in a fixed and non-detachable manner.

The spaced-apart inner and outer edges of the welding surfaces-viewed in the vertical direction-bring about a planar extent of the annular welding surfaces. The width of the welding surfaces is between 3 mm and 15 mm, preferably approx. 5 mm, viewed running in the radial direction or obliquely, and therefore here in particular the mirror welding process is particularly suitable. The flatter the welding surfaces are oriented on the container side and on the threaded welding head, the wider is the extent to which they overlap. The steeper the welding surfaces are oriented on the container side and on the threaded welding head, the less is the extent to which they overlap, until ultimately there is no longer any overlap in the case of vertically oriented welding surfaces and welding by the mirror welding process cannot be performed. In the case of vertically oriented welding surfaces of this type, the bung connectors and the top of the container are usually welded by deposition welding with the addition of molten plastic material.

The solid threaded welding head, prefabricated in an injection molding process, prevents the bung opening and the sealing seat for the bung fitting from possibly becoming oval in shape and comprises precisely formed thread turns with sharp thread flanks. In the region of its largest diameter, the solid threaded welding head has a thickening or accumulation of plastic material with a wall thickness, of approx. 6-8 mm, that is virtually twice as thick in comparison with the wall thickness of the top of the container, which has a wall thickness of approx. 3-4 mm.

In principle, the threaded welding head could be materially bonded to the top of the plastic container in various ways, e.g. by gluing, wetting or the like. In the present invention, the material bond should preferably be effected in the known mirror welding process which is particularly suitable for this, the two welding surfaces being partially melted by applying correspondingly shaped, heated welding elements and, after removing the welding elements, being firmly pressed against one other and connected or welded to one another in a non-detachable manner.

One configuration of the invention provides that the annular welding surface on the container side and the corresponding annular welding surface on the solid threaded welding head are formed as running substantially obliquely in three dimensions. In this respect, the opening, which is enclosed by the annular welding surface, in the top of the container has an almost trapezoidal form when viewed in cross section. Expressed differently, when the container is positioned upright with the openings upward, the opening, which is enclosed by the annular welding surface on the container side, in the top of the container constitutes an upside-down form of a conical section with base upward and tip downward.

With normal upright positioning of the container, the outer edges of the two welding surfaces lying one on top of the another are advantageously arranged higher than the inner edges of the two welding surfaces. This design configuration makes it possible to better center and vertically orient the solid threaded welding head when it is being welded in.

In a modified embodiment of the invention, the annular welding surface on the container side has a substantially concave form and the annular welding surface on the threaded welding head has a substantially convex form. The adaptation of the two three-dimensional annular welding surfaces to one another that is carried out enables better centering and orientation of the threaded welding head when it is being welded into the top of the container.

A preferred modification of the invention provides that the outer side of the threaded welding head has a dome-like form at least in the region of its annular welding surface and the annular welding surface on the container side has a corresponding negative dome-like form. The dome-shaped form of the annular welding surfaces of the two parts to be welded makes it possible to most effectively compensate unevennesses and inclinations in the base region of the bung housing or when the top of the container is slightly convex, and therefore a precise vertical orientation of the welded-in threaded welding head is achieved, as a result of which existing problems and faults caused thereby when using blow-molded plastic containers in existing filling and pumping installations no longer occur.

In a very particularly preferred design configuration, the outer side of the threaded welding head has an almost entirely dome-like form. The threaded welding head has the form of a spherical segment, also referred to as spherical disk, and is a part of a full sphere that is cut by two parallel planes. The curved surface part is referred to as spherical zone and constitutes the dome-like outer side of the threaded welding head.

The specific form of a spherical dome allows optimal welding-in conditions and a solid configuration of the threaded welding head in a decorative design. In the case of blow-molded bung drums, the plastic material is usually colored blue. The separate manufacture of the threaded welding heads in an injection molding process makes it possible to choose another color for the welded-on threaded welding heads. As an indication of certain contents, the prefabricated threaded welding heads can comprise e.g. the color red for hazardous goods containers, the color green for plastic containers with environmentally friendly contents or the color yellow for food-safe plastic containers.

The compact spherical dome-like configuration of the solid threaded welding head particularly makes it possible that the annular welding surface on the container side is formed virtually without a connector and directly in the bung opening in the top of the container on a formed-on bead ring. In this way, e.g. the depression of a bung housing or of a bung hollow in the top of the plastic container can be kept particularly flat, as a result of which improved residual emptying of the plastic container can be realized. The direct welding of a threaded welding head without a connector and virtually directly into a bung opening in the top of a container is suitable in particular for 1000 liter plastic inner containers of pallet containers that do not have a separate bung housing for the bung opening, but only a deeper middle region of the top of the inner container.

In one design configuration of the invention, preferably in the case of bung drums and canisters, the annular welding surface on the container side is formed on the upper edge of a short welded bung connector enclosing the bung opening in the top of the container. The welded bung connectors for the conventional ¾-inch, 2-inch and 3-inch bung closures are expediently formed as standard welded bung connectors with a respectively identical contour, regardless of the container size. In this respect, "identical contour" means the same dimensions in terms of length and diameter.

In that case, the drum bodies or drums having a handling ring can also be produced as universal drum bodies with standard welded bung connectors of reduced wall thickness, as it were, in the blow mold for the various bung closures without frequently interchanging the blowing mandrels. By reducing conversion times and shortening cooling times, a significant increase in the number of items is achieved.

Freely selectable, prefabricated standard threaded welding heads with all conventional thread forms can then be welded into the standard welded bung connector.

If drums with a handling ring are used in Europe, the one bung is usually designed as a 2-inch filling and emptying bung and the other bung as a ¾-inch aeration and ventilation bung, each having a coarse thread, while drums with a handling ring which are used primarily in the American or Asian market are equipped with two 2-inch bungs, in that case the one bung being equipped with a coarse thread and the other bung being equipped with a fine thread.

Numerous advantages can be achieved by the present invention:

it is possible to insert a thin-walled inliner into the universal drum body and radially weld in the thin-walled inliner connector in the cylindrical region of the standard welded bung connector and only then to fit or weld the threaded welding head having any desired thread onto the standard welded bung connector;

the manufacture of the universal drum body with the two standard welded bung connectors can be optimized in terms of blow molding technology, e.g. by shortening the cycle times, since the intensive cooling of the usual threaded flanges is dispensed with and the unscrewing time for the threaded blowing mandrels is also omitted;

the wall thickness of the tubular preform can be better controlled, since the plastic material is no longer required to form the thread;

a change of tools (different shells and blowing mandrels) when changing from one bung connector geometry to another bung connector geometry (coarse thread fine thread) is dispensed with;

the tolerances of the threaded flanges can be improved or minimized, this being important in particular in the case of the American fine thread (NPS 2-inch);

the ovality of the threaded opening in the threaded welding heads is eliminated;

possible inclination of the standard welded bung connectors with respect to the top of the container can be compensated by the dome geometry of the threaded welding heads during the welding-on operation;

the tolerances of the external geometry for the sealing caps to be fitted on can be set significantly closer;

threaded welding heads with an individually colored configuration allow a visual distinction to be made from the usual standard blue drums with a handling ring;

planar welding surfaces can also be implemented as alternative welding geometries with the highest degree of simplicity.

Figure 2:
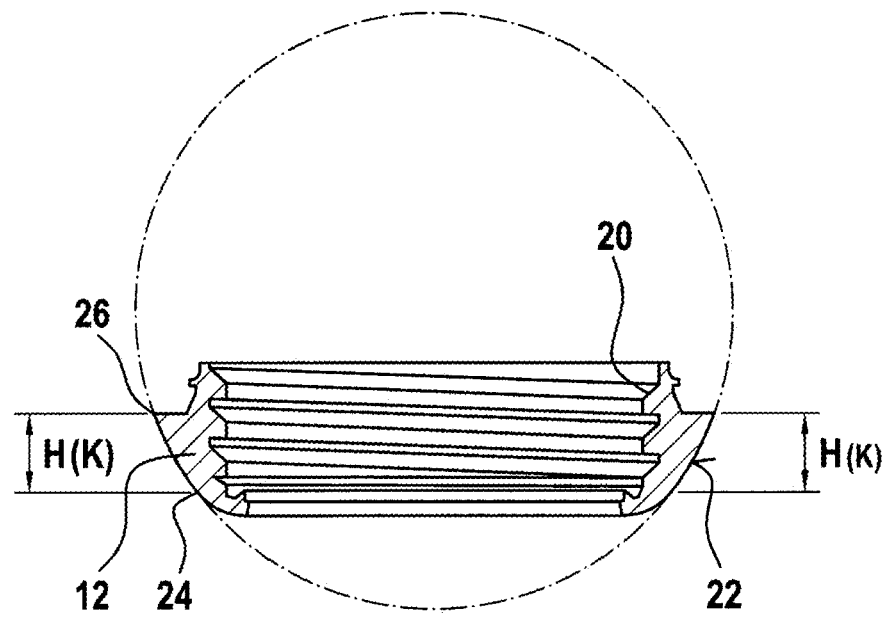
Figure 3:
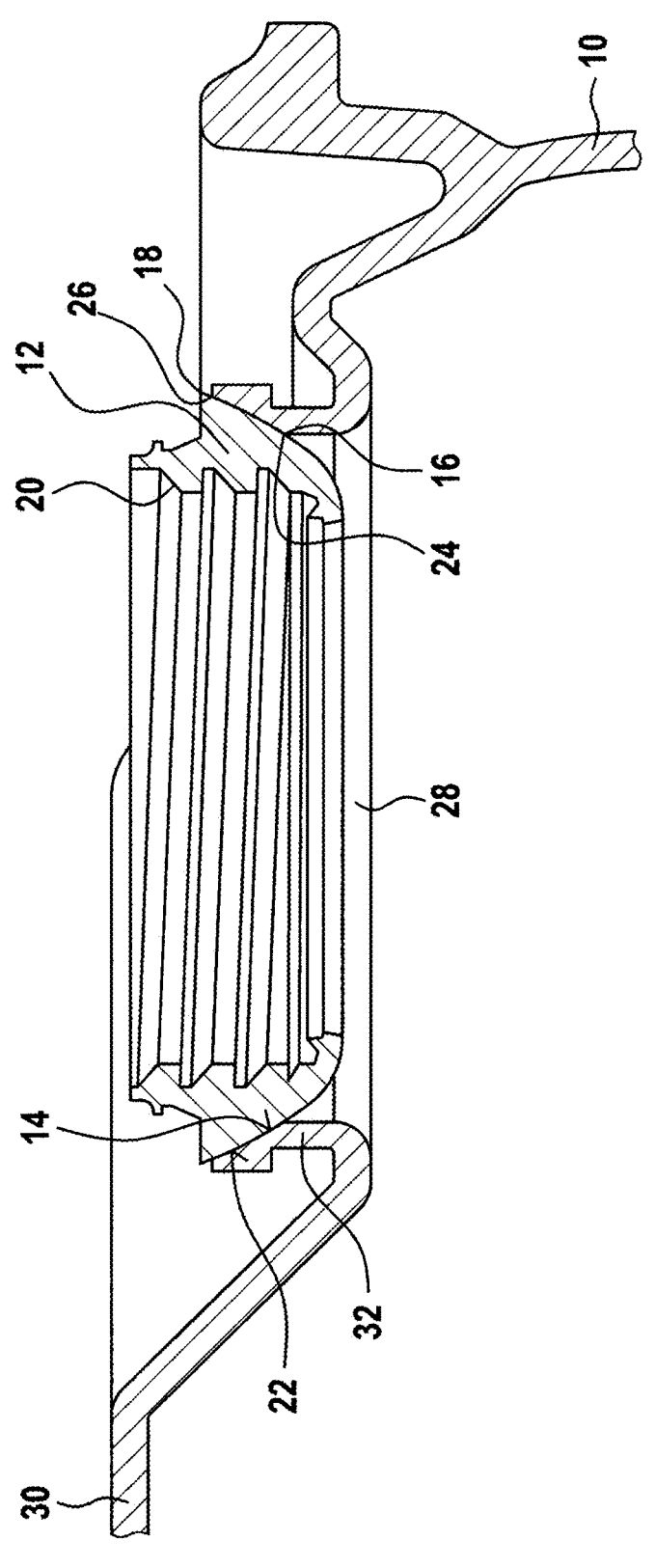
Figure 4:
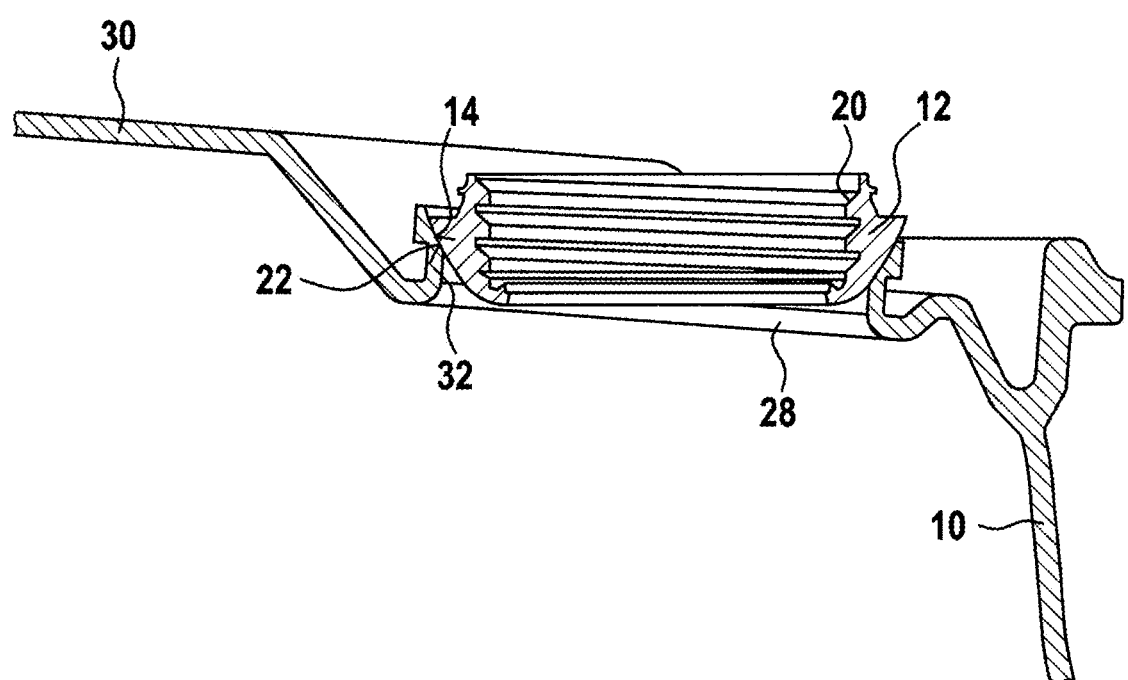
Figure 5:
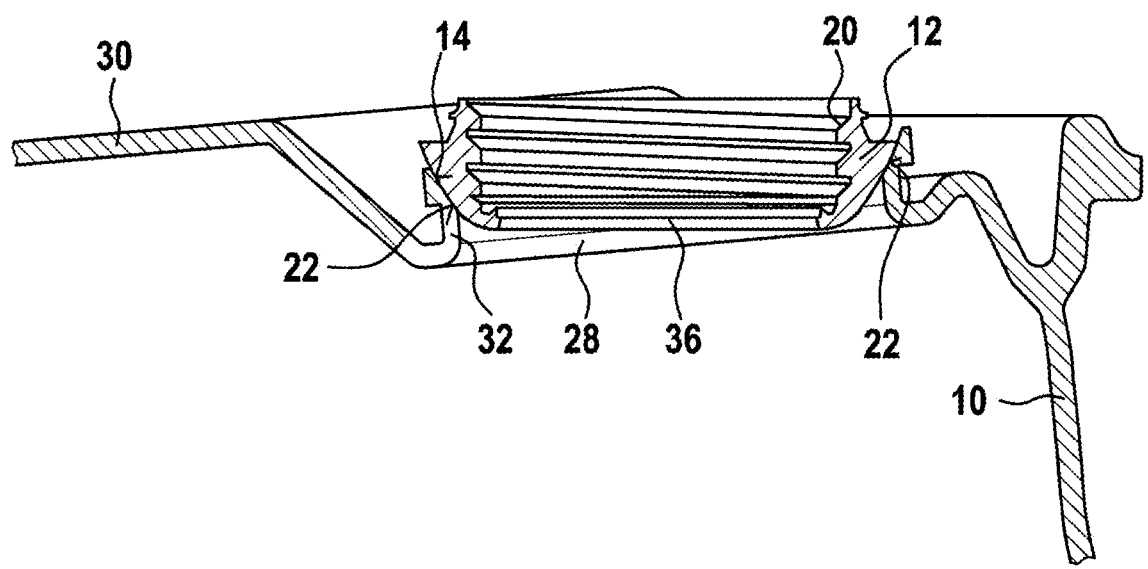
Figure 6:
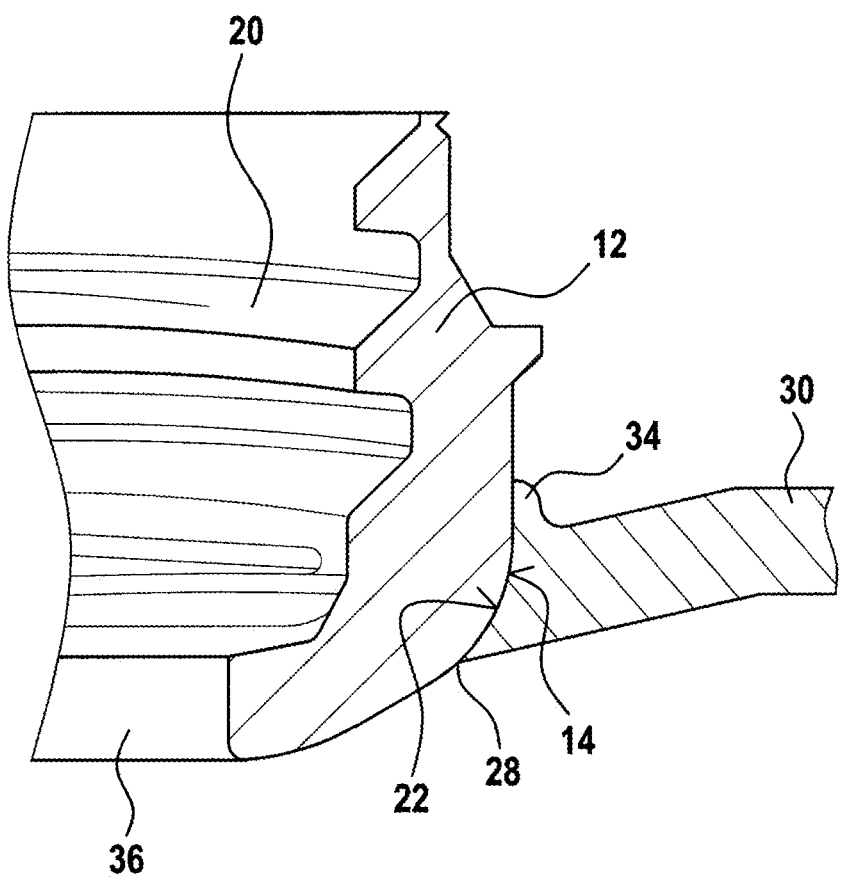

The invention is explained and described in more detail below with reference to exemplary embodiments shown schematically in the drawings, in which:

FIG. 1 shows a perspective view of a blow-molded plastic container according to the invention in the form of a bung drum with welded-in threaded welding flanges, FIG. 2 shows a cross-sectional view of a threaded welding head according to the invention, FIG. 3 shows a partial cross-sectional view through a welded-in threaded welding flange, FIG. 4 shows another partial cross-sectional view through a welded-in threaded welding head, FIG. 5 shows a further partial cross-sectional view through a welded-in threaded welding head, FIG. 6 shows a partial cross-sectional view of another embodiment of a welded-in threaded welding head.

FIG. 1 illustrates a bung drum made of thermoplastic material and denoted by the reference numeral 10 as a preferred exemplary embodiment of a blow-molded plastic container. Bung drums with an upper handling ring are available in a variety of drum sizes with a filling volume of from 30 liters to 300 liters. The most common are 220 liter bung drums with two bung closures in the top of the drum. According to the invention, the bung closures are each provided with a welded-in threaded welding head 12, pre-fabricated in an injection molding process, into which the customary bung fittings are screwed in order to close the bung opening 28 in a gas- and liquid-tight manner.

An embodiment according to the present invention of a threaded welding head is illustrated in FIG. 2. The threaded welding heads 12 according to the invention can be designed in various sizes. Preferred sizes are ¾-inch, 2-inch and 3-inch threaded welding heads. The threaded welding heads 12 according to the invention can furthermore be provided with various types of thread, specifically either with a coarse thread and a seal seat arranged below the thread or with a fine thread and a seal seat arranged above the thread.

2-inch threaded welding heads can moreover be formed with a customary BCS 70×6 thread.

The upper bung connector part, prefabricated in an injection molding process, is in the form of a solid threaded welding head 12 such as a spherical-dome ring element with a central bore for receiving an internal thread and a wall part enclosing the bore and having a wall thickness thickened by material accumulation.

The solid threaded welding head 12 with an internal thread 20 has an annular welding surface 22, which has a circular inner edge 24 and a circular outer edge 26, on the circumference. The outer side of the threaded welding head 12 can have a dome-like form on the circumference at least in the region of its annular welding surface 22. In a preferred embodiment, the outer side of the threaded welding head 12 has an almost entirely dome-like form. The spherical dome form of the threaded welding head 12 is represented by the circle indicated by a dashed line in FIG. 2 and has the shape of a three-dimensional spherical segment with a uniformly curved outer spherical zone as the dome-like outer side of the threaded welding flange.

The height of the annular welding surface 22 is defined by the arrow H(K).

FIG. 3 illustrates a threaded welding head 12 in the installed state in the case of a bung drum 10 with a circumferential handling ring. The bung opening 28 arranged in a bung hollow of the top 30 is enclosed by a welded bung connector 32. Formed on the upper edge of the welded bung connector 32 is an annular welding surface 14 with a negative dome-like contour, which has a circular inner edge 16 at the bottom and a circular outer edge 18 at the top. The welded-in threaded welding head 12 with a dome-like outer side accordingly comprises the annular welding surface 22 with a circular inner edge 24 and a circular outer edge 26. In this way, with normal upright positioning of the bung drum 10, the outer edges 18, 26 of the two welding surfaces 14, 22 lying one on top of the another are thus arranged higher than the inner edges 16, 24 of the two welding surfaces 14, 22. The mirror welding process, which is particularly suitable, is used for the welding operation on account of the comparatively large width of the welding surfaces, which is between 3 mm and 15 mm, preferably approx. 5 mm, running in the radial direction or obliquely. After the welding operation, the two annular welding surfaces 14 and 22 are connected or welded to one another in a materially bonded, fixed and non-detachable manner.

FIG. 4 illustrates the upper region of a bung drum 10, in the case of which, in an exaggerated form in the drawing, the top 30 is strongly upwardly convex or bulged outward—e.g. by virtue of subsequent cooling possibly under an exces-sively high internal pressure. As a result, the welded bung connector 32 is slightly warped and outwardly deflected here. The dome shape of the welded bung connector 32 also makes it possible for the internal thread 20 of the bung opening 28 to be oriented vertically even if the top 30 is "crooked".

It is possible that, as a result of the slower cooling of thick locations, in particular along the flash seams of a plastic hollow body removed from the blow mold after the opera-tion of shaping by blow molding, stresses internal to the material cause distortion, which can lower the top of the hollow body inward or downward. One such case is illus-trated in FIG. 5 in an exaggerated form in the drawing, in which, in the case of the bung drum 10, the top 30 has lowered downward and the welded bung connector 32 is inclined toward the middle of the top 30. The vertical orientation of the dome-like threaded welding head 12 compensates the inclination of the welded bung connector 32, with the result that the internal thread 20 in the bung opening 28 with a screwed-in bung fitting is precisely oriented for the use of automatic screwing machines and filling lances in automatic filling installations and problems no longer arise.

In the context of the present invention, in a simple embodiment, the annular welding surface 14 on the con-tainer side and the corresponding annular welding surface 22 on the solid threaded welding head 12 can be formed as running obliquely in three dimensions. In that case, the bung opening 28 enclosed by the annular welding surface 14 in the top 30 of the bung drum 10 has an almost trapezoidal form when viewed in cross section. In a modified form, it is also possible for the annular welding surface 14 on the container side to be formed as concave and the annular welding surface 22 on the threaded welding head 12 to be formed as convex.

In a particularly preferred embodiment, the annular weld-ing surface 14 on the container side is arranged on the upper, somewhat widened edge of the weld bung connector 32 of shortened form which encloses the container opening 28 in the top 30 of the container 10. In this respect, the welded bung connector 32 is formed respectively as a standard welded bung connector with the same diameter of e.g. 65 mm for the conventional ¾-inch, 2-inch and 3-inch bung closures, regardless of the container size, onto which welded bung connector a correspondingly adapted standard threaded welding head 12 with likewise always the same diameter of e.g. 70 mm is welded, the opening 36 of which, which has an internal thread, can be freely selected for the use of the conventional ¾-inch, 2-inch and 3-inch bung closures.

A frequently used threaded welding head is designed for a bung closure or bung fitting BSC 70×6 for steel scaling caps.

It is thus possible for e.g. bung drums in the container sizes 60 I, 120 I, 220 I or 250 I which have a standard welded bung connector 32 of shortened form to always be produced with the same diameter of 65 mm, without the mold insert in the blow mold having to be interchanged for various bung opening diameters or for various bung plug sizes (¾-inch, 2-inch, 3-inch). As a result, significantly higher numbers of drums can be produced; this is possible also because shorter cooling times or cycle times are required for the standard welded bung connectors 32 of shortened form. Depending on the customer demand, prefabricated standard threaded welding heads with always the same diameter, with a freely selectable color and with a freely selectable size of the bung fitting and thread type (coarse thread, fine thread) and sealing seat (above or below the thread) can be welded onto the standard welded bung connectors of shortened form.

Threaded welding heads can be prefabricated for the following bung closures: BCS 70×6, 2" Butress, 2" NPS, BCS 56×4, BCS 38×6 and others. In this respect, the external diameter of the threaded welding heads remains always the same at approx. 65 to 70 mm. Only the diameter of the central threaded opening is variable for the various bung closures, in that case the wall thickness increasing with the smaller bung openings.

By virtue of the manufacture by blow molding of bung drums with standard welded bung connectors of shortened form, there is still the option of inserting a thin-walled inliner into the prefabricated bung drum and welding on the thin-walled inliner connector inside the standard welded bung connector before the desired threaded welding head e.g. of the color yellow is welded onto the standard welded bung connector. The yellow color of the threaded welding head can designate e.g. a bung drum with an inserted inliner, since this is otherwise not visible from the outside without opening the bung closures.

Furthermore, FIG. 6 illustrates an embodiment in which the annular welding surface 14 on the container side is formed virtually without a connector and directly in the bung opening 28 in the top 30 of the bung drum 10. In this respect, in addition, a circumferential bead edge ¾ can be formed on the upper edge of the bung opening 28 on the top 30. As a result, it is possible—if desired—to increase the width of the annular welding surface 14. This embodiment is particularly intended for smaller containers such as canisters or small bung drums which have only a shallow bung hollow or do not have a deeper-recessed bung hollow at all to protect a bung connector.

CONCLUSION

The present invention teaches how the advantages of blow molding technology-large numbers of items at comparatively low production costs—can be combined in a simple manner with the advantages of injection molding technology—precise geometric dimensions on the sealing seats and screw threads on the container side.

LIST OF REFERENCE NUMERALS

10 Plastic container (e.g. bung drum)
12 Threaded welding head (10)
14 Annular welding surface on the container side (10)
16 Circular inner edge on the container side (14)
18 Circular outer edge on the container side (14)

20 Internal thread (12)
22 Annular welding surface on the flange side (12)
24 Circular inner edge on the flange side (22)
26 Circular outer edge on the flange side (22)
28 Container opening (30)
30 Top (10)
32 Welded bung connector (30)
34 Circumferential beaded edge (30)
36 Opening in the threaded welding head (12)
H(K) Height of the welding surface (22)

What is claimed is:

1. A method comprising:
creating a container body from a thermoplastic material via a blow molding process, the container body having a first opening extending through a top of the container body, and forming a bung receiver portion in the top of the container body, the bung receiver portion having a concave shape that faces toward the first opening and extends inwardly toward an inner portion of the container body, at least a portion of the concave shape including a first annular attachment surface surrounding the first opening;
creating a bung attachment part via an injection molding process, forming a lower portion of the bung attachment part, the lower portion having a convex shape mirroring the concave shape of the bung receiver portion and at least a portion of the convex shape includes a second annular attachment surface complementary to the first annular attachment surface, the bung attachment part having a second opening extending therethrough and an internally threaded surface located within the second opening; and
attaching the bung attachment part to the concave shape of the bung receiver portion such that the second opening is at least partially aligned with the first opening.

2. The method of claim 1, wherein attaching the bung attachment part to the concave shape of the bung receiver portion comprises welding the bung attachment part to the bung receiver portion.

3. The method of claim 2, wherein welding the bung attachment part to the bung receiver portion includes using a mirror welding process.

4. The method of claim 1, wherein attaching the bung attachment part to the concave shape of the bung receiver portion comprises:
positioning the bung attachment part on the bung receiver portion such that at least a portion of the second annular attachment surface abuts at least a portion of the first annular attachment surface; and
materially bonding the at least a portion of the second annular attachment surface to the at least a portion of the first annular attachment surface such that the bung attachment part is fixedly and non-detachably attached to the bung receiver portion.

5. The method of claim 1, wherein the bung receiver portion includes a circumferential beaded edge, the first annular attachment surface being arranged on the bung receiver portion at an edge of the first opening.

6. The method of claim 1, wherein:
the bung receiver portion includes a first circular inner edge and a first circular outer edge, the first circular inner edge has a diameter that is less than a diameter of the first circular outer edge; and
creating the bung attachment part comprises forming a bung attachment part having the second annular attachment surface that includes a second circular inner edge and a second circular outer edge, the second circular inner edge have a diameter that is less than a diameter of the second circular outer edge.

7. The method of claim 6, wherein, when the container body is an upright resting configuration in which the top of the container body is positioned above a bottom of the container body:

the first circular outer edge is positioned above the first circular inner edge; and the second circular outer edge is positioned above the second circular inner edge.

\* \* \* \* \*